US008666951B2

(12) United States Patent
Hanis et al.

(10) Patent No.: US 8,666,951 B2
(45) Date of Patent: Mar. 4, 2014

(54) MANAGING MULTIPLE VERSIONS OF ENTERPRISE META-MODELS USING SEMANTIC BASED INDEXING

(75) Inventors: Thomas T. Hanis, Raleigh, NC (US); Eoin Lane, Littleton, MA (US); Fang Lu, Billerica, MA (US); Azadeh Salehi, Pepperell, MA (US); Alphonse J. Wojtas, East Hampstead, NH (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/354,577

(22) Filed: Jan. 20, 2012

(65) Prior Publication Data
US 2013/0191357 A1 Jul. 25, 2013

(51) Int. Cl.
*G06F 17/30* (2006.01)

(52) U.S. Cl.
USPC .......................................... 707/695; 707/802

(58) Field of Classification Search
CPC .................... G06F 17/30286; G06F 13/30008; G06F 17/30309
USPC ................................... 707/695, 802, 999.203
See application file for complete search history.

(56) References Cited

U.S. PATENT DOCUMENTS

| 5,109,433 | A  | * | 4/1992 | Notenboom | 382/240 |
| 6,430,563 | B1 | * | 8/2002 | Fritz et al. | 707/694 |
| 6,954,749 | B2 | * | 10/2005 | Greenblatt et al. | 707/778 |
| 7,613,712 | B2 | * | 11/2009 | Greenblatt et al. | 1/1 |
| 7,613,745 | B2 | * | 11/2009 | Letkeman et al. | 1/1 |
| 7,707,206 | B2 | * | 4/2010 | Encina et al. | 707/716 |
| 7,734,457 | B2 |   | 6/2010 | Deffler |  |
| 7,761,850 | B2 |   | 7/2010 | Kilian-Kehr |  |
| 7,865,465 | B2 | * | 1/2011 | Vierich et al. | 707/615 |
| 7,865,519 | B2 | * | 1/2011 | Stuhec | 707/771 |
| 7,926,033 | B2 | * | 4/2011 | Gopal et al. | 717/122 |
| 8,056,047 | B2 | * | 11/2011 | Lucas et al. | 717/104 |
| 8,244,768 | B2 | * | 8/2012 | Lane et al. | 707/792 |
| 8,312,041 | B2 | * | 11/2012 | Jung et al. | 707/776 |
| 2003/0084424 | A1 |   | 5/2003 | Reddy et al. |  |
| 2004/0073545 | A1 | * | 4/2004 | Greenblatt et al. | 707/3 |
| 2004/0103393 | A1 |   | 5/2004 | Reddy et al. |  |
| 2005/0289134 | A1 | * | 12/2005 | Noguchi | 707/4 |
| 2008/0104140 | A1 | * | 5/2008 | Vierich et al. | 707/202 |
| 2008/0140616 | A1 | * | 6/2008 | Encina et al. | 707/3 |
| 2008/0294702 | A1 | * | 11/2008 | Letkeman et al. | 707/203 |

(Continued)

OTHER PUBLICATIONS

Xue et al., "Merging of Topic Maps Based on Corpus", 2010 International Conference on Electrical and Control Engineering, IEEE, 2010, pp. 2840-2843.*

(Continued)

*Primary Examiner* — Phuong Thao Cao
(74) *Attorney, Agent, or Firm* — Brown & Michaels, PC

(57) ABSTRACT

A method, system and program product of managing multiple versions of enterprise meta-models within an enterprise model using semantic based indexing. The steps include: receiving a query; determining from the query a topic and at least two versions of a topic map meta-model of the enterprise meta-models to compare; applying the query to a merged topic map meta-model of the at least two versions of the topic map meta-model by searching a topic map based index of the merged topic map meta-model for the topic, producing a result; and using the result to translate the topic from the query in at least one of the at least two versions of the topic map meta-model to coexist and correspond to the other version of the topic map meta-model, allowing data between the at least two versions topic map meta-model of the enterprise meta-models within the enterprise model to be correlated.

21 Claims, 11 Drawing Sheets

(56) References Cited

U.S. PATENT DOCUMENTS

| | | | |
|---|---|---|---|
| 2009/0049040 A1* | 2/2009 | Fay et al. | 707/5 |
| 2009/0063522 A1* | 3/2009 | Fay et al. | 707/100 |
| 2010/0142715 A1* | 6/2010 | Goldstein et al. | 381/56 |
| 2010/0191742 A1* | 7/2010 | Stefik et al. | 707/748 |
| 2011/0153292 A1* | 6/2011 | Lane et al. | 703/6 |
| 2011/0153293 A1* | 6/2011 | Coldicott et al. | 703/6 |
| 2011/0153608 A1* | 6/2011 | Lane et al. | 707/738 |
| 2011/0153610 A1* | 6/2011 | Carrato et al. | 707/738 |
| 2011/0153636 A1* | 6/2011 | Coldicott et al. | 707/769 |
| 2011/0153767 A1* | 6/2011 | Coldicott et al. | 709/207 |
| 2011/0167418 A1* | 7/2011 | Gopal et al. | 717/170 |
| 2011/0225150 A1* | 9/2011 | Whitman | 707/723 |
| 2012/0226716 A1* | 9/2012 | Yeh et al. | 707/797 |
| 2012/0278353 A1* | 11/2012 | Carrato et al. | 707/769 |

OTHER PUBLICATIONS

Garshol, M. L., "tolog—A Topic Maps Query Language", TMRA 2005, LNAI 3873, pp. 183-196, 2006.*

Stefanova, et al., "Viewing and Querying Topic Maps in terms of RDF", SeMMA 2008, CEUR Workshop Proceedings, 2008, 15 pages.*

Widhalm et al., "Mergining Topics in Well-Formed XML Topic Maps", ISWC 2003, LNCS 2870, pp. 64-79, 2003.*

Kim, et al., "Schema and Constraints-based Matching and Merging of Topic Maps", Information Proceeding and Management 43 (2007), pp. 930-945, 2007.*

Jung, et al., "Methodology of Topic Map Creation and Semantic Web for Technological Information Search regarding Injection-Mold based on Collaboration Hub", The International Conference on Smart Manufacturing Application (ICSMA 2008), 2008, pp. 78-83.*

Andres, et al., "Ontology Driven Data Management with Topic Maps", ICDEM 2010, LNCS 6411, pp. 16-23, 2012.*

Kiryakov, A. et al.; "Tracking Changes in RDF(S) Repositories"; OntoText Lab, Sirma AI EOOD; 2002; pp. 27-35.

Lin, Y. et al.; "Model Comparison: A Key Challenge for Transformation Testing and Version Control in Model Driven Software Development"; University of Alabama at Birmingham; 2004; 6 pages.

* cited by examiner

MANAGING MULTIPLE VERSIONS OF ENTERPRISE META-MODELS USING SEMANTIC BASED INDEXING

TECHNICAL FIELD

The present invention relates to managing multiple versions of enterprise meta-models of a complex legacy application environment or enterprise model, and more specifically to querying differences between multiple versions of an enterprise model.

BACKGROUND

Almost all companies have complex legacy application environments. Such an environment consists of all the applications, programs, and data that a company depends on to successfully manage its day to day operations. Within these applications, programs, and data are encapsulated one or more meta-models of the company's physical, intellectual, and financial assets.

An enterprise meta-model of a complex legacy application environment defines the ontology for these assets, and the enterprise meta-model can evolve and change over time. Beyond changes to the enterprise meta-model, the instance data that is referenced through the enterprise meta-model will also very likely change over time.

SUMMARY

According to one embodiment of the present invention, a method of managing multiple versions of enterprise meta-models within an enterprise model using semantic based indexing. The method comprising the steps of: a computer receiving a search query from a user; the computer determining from the search query a topic and at least two versions of a topic map meta-model of the enterprise meta-models within the enterprise model to compare; the computer applying the search query from the user to a merged topic map meta-model of the at least two versions of the topic map meta-model by searching a topic map based index of the merged topic map meta-model for the topic, producing a result; and the computer using the produced result to translate the topic from the query in at least one of the at least two versions of the topic map meta-model of the enterprise meta-model to coexist and correspond to the other version of the topic map meta-model of the enterprise meta-model, allowing data between the at least two versions topic map meta-model of the enterprise meta-models within the enterprise model to be correlated.

According to another embodiment of the present invention, a computer program product for managing multiple versions of models using semantic based indexing. The computer program product comprising: one or more computer-readable, tangible storage devices; program instructions, stored on at least one of the one or more storage devices, to receive a search query from a user; program instructions, stored on at least one of the one or more storage devices, to determine from the search query a topic and at least two versions of a topic map meta-model of the enterprise meta-models within the enterprise model to compare; program instructions, stored on at least one of the one or more storage devices, to apply the search query from the user to a merged topic map meta-model of the at least two versions of the topic map meta-model by searching a topic map based index of the merged topic map meta-model for the topic, producing a result; and program instructions, stored on at least one of the one or more storage devices, to use the produced result to translate the topic from the query in at least one of the at least two versions of the topic map meta-model of the enterprise meta-model to coexist and correspond to the other version of the topic map meta-model of the enterprise meta-model, allowing data between the at least two versions topic map meta-model of the enterprise meta-models within the enterprise model to be correlated.

According to another embodiment of the present invention, a computer system of managing multiple versions of models using semantic based indexing. The computer system comprising: one or more processors, one or more computer-readable memories and one or more computer-readable, tangible storage devices; program instructions, stored on at least one of the one or more storage devices for execution by at least one of the one or more processors via at least one of the one or more memories, to receive a search query from a user; program instructions, stored on at least one of the one or more storage devices for execution by at least one of the one or more processors via at least one of the one or more memories, to determine from the search query a topic and at least two versions of the topic map meta-model of the enterprise meta-models within the enterprise model to compare; program instructions, stored on at least one of the one or more storage devices for execution by at least one of the one or more processors via at least one of the one or more memories, to apply the search query from the user to a merged topic map meta-model of the at least two versions of the topic map meta-model by searching a topic map based index of the merged topic map meta-model, producing a result; and program instructions, stored on at least one of the one or more storage devices for execution by at least one of the one or more processors via at least one of the one or more memories, to use the produced result to translate the topic from the query in at least one of the at least two versions of the topic map meta-model of the enterprise meta-model to coexist and correspond to the other version of the topic map meta-model of the enterprise meta-model, allowing data between the at least two versions topic map meta-model of the enterprise meta-models within the enterprise model to be correlated.

DETAILED DESCRIPTION

The illustrative embodiments recognize that a challenge with enterprise meta-models is the requirement to intelligently manage them and their associated instances as the enterprise meta-models evolve and change over time. The illustrative embodiments also recognize that simply merging enterprise models and enterprise model instances may not be sufficient, as not only is such merging often difficult and time consuming, but the notion of a temporal reference to the models as it had previously existed is lost. The evolution of enterprise meta-models and their associated instance data presents an opportunity for an intelligent approach to handling enterprise model versions.

Figure 1:
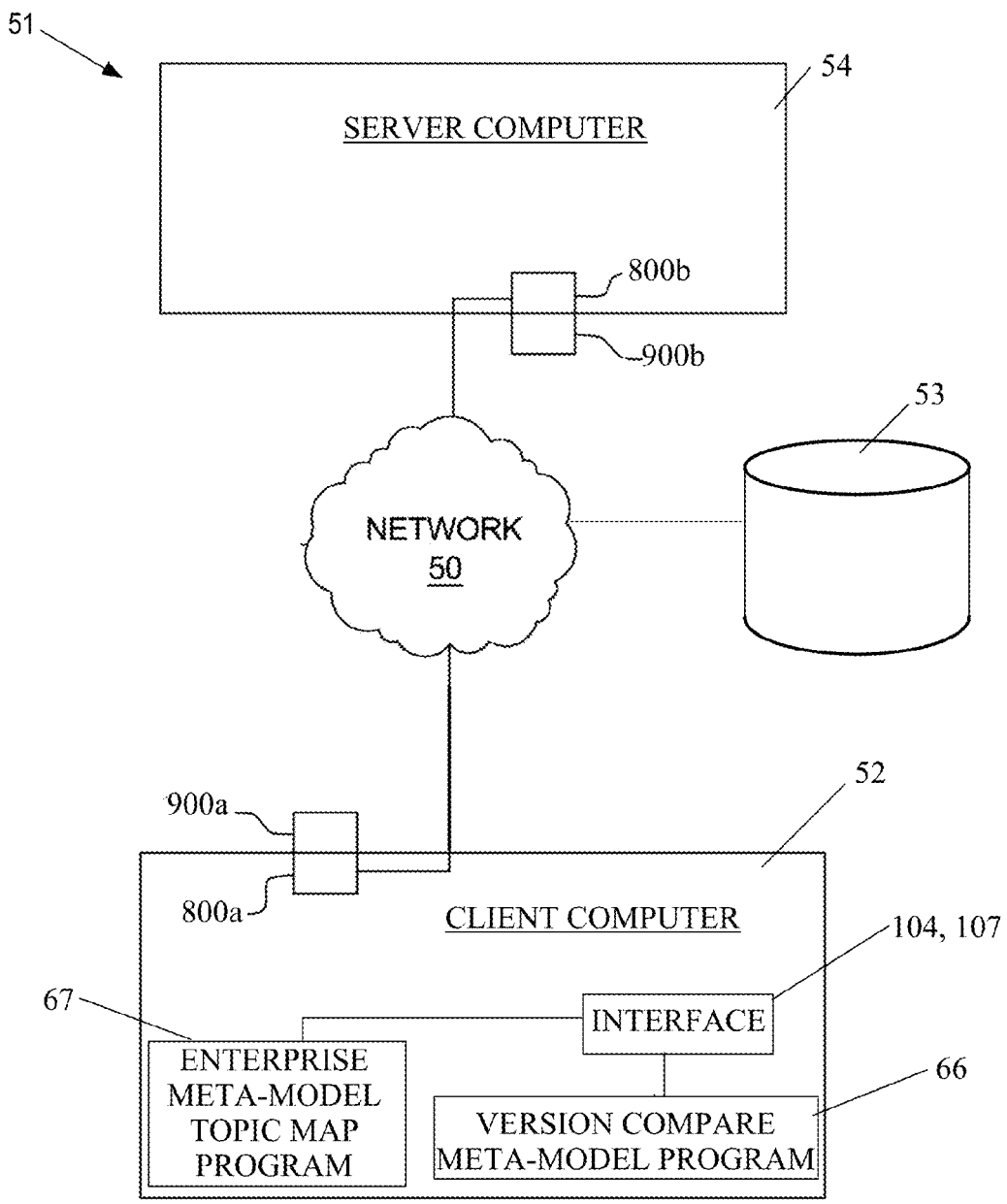
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

Figure 2:
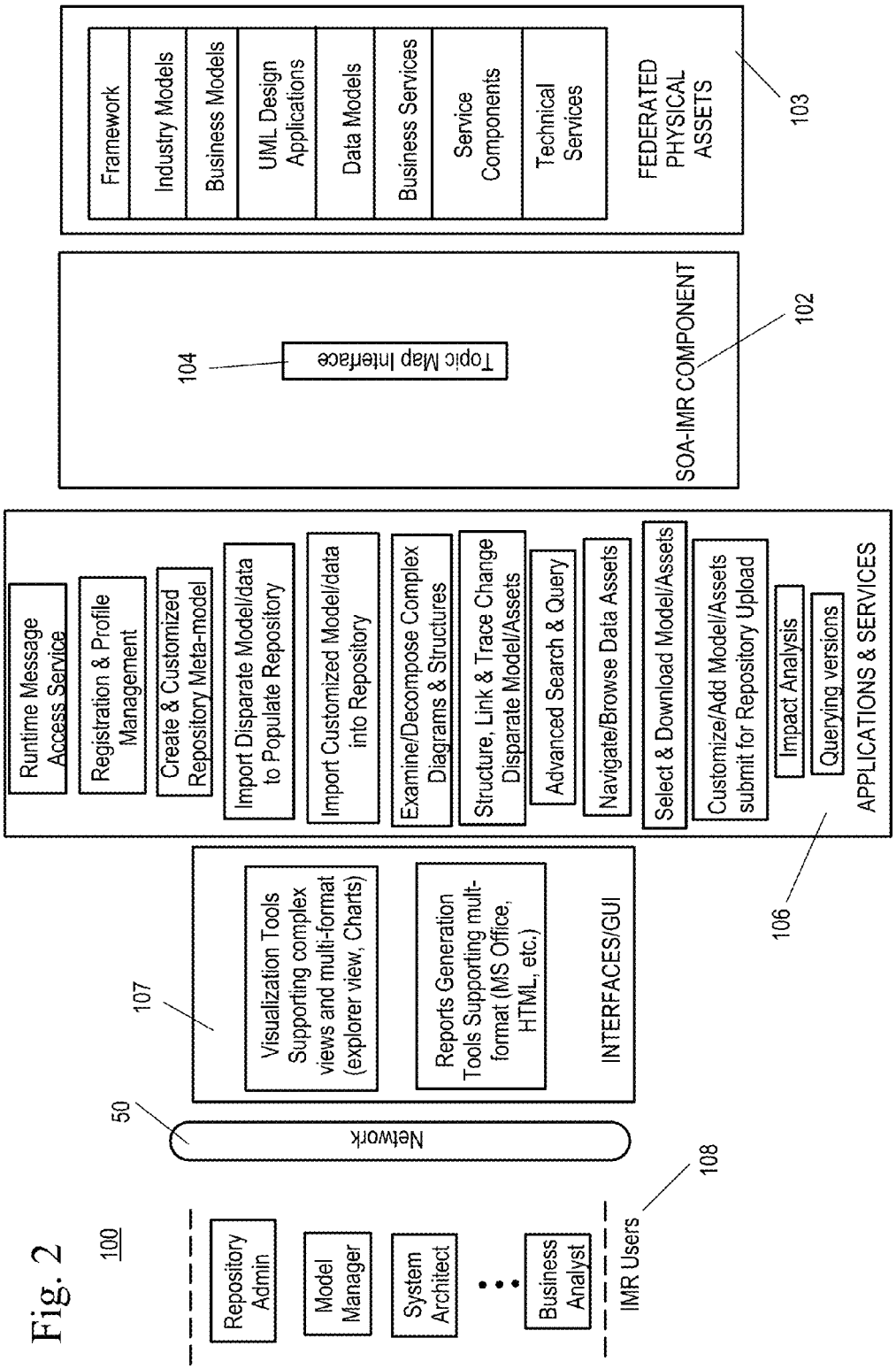
FIG. 2 shows an example of an industry model repository (IMR) architecture system including a Service-oriented architecture (SOA) IMR component.

In the depicted example, client computer 52, storage unit 53, and server computer 54 connect to network 50. In other exemplary embodiments, network data processing system 51 may include additional client computers, storage devices, server computers, and other devices not shown. Client computer 52 includes a set of internal components 800a and a set of external components 900a, further illustrated in FIG. 11. Client computer 52 may be, for example, a mobile device, a cell phone, a personal digital assistant, a netbook, a laptop computer, a tablet computer, a desktop computer, or any other type of computing device. Client computer 52 may contain a topic map interface 104 and/or other interfaces 107. Through topic map interface 104, different topic maps in different scopes may be viewed by users. Additionally, through topic map interface 104, queries between different versions of enterprise models of a topic map may be performed and results of the searches may be displayed. Topic map interface 104 may accept commands and data entry from a user 108 as shown in FIG. 2. Topic map interface 104 can be, for example, a command line interface, a graphical user interface (GUI), or a web user interface (WUI) through which a user can access an enterprise meta-model topic map generator program 67 and/or a version compare meta-model program 66 on client computer 52, as shown in FIG. 1, or alternatively on server computer 54. Server computer 54 includes a set of internal components 800b and a set of external components 900b illustrated in FIG. 11.

In the depicted example, server computer 54 provides information, such as boot files, operating system images, and applications to client computer 52. Server computer 54 can compute the information locally or extract the information from other computers on network 50.

Figure 11:
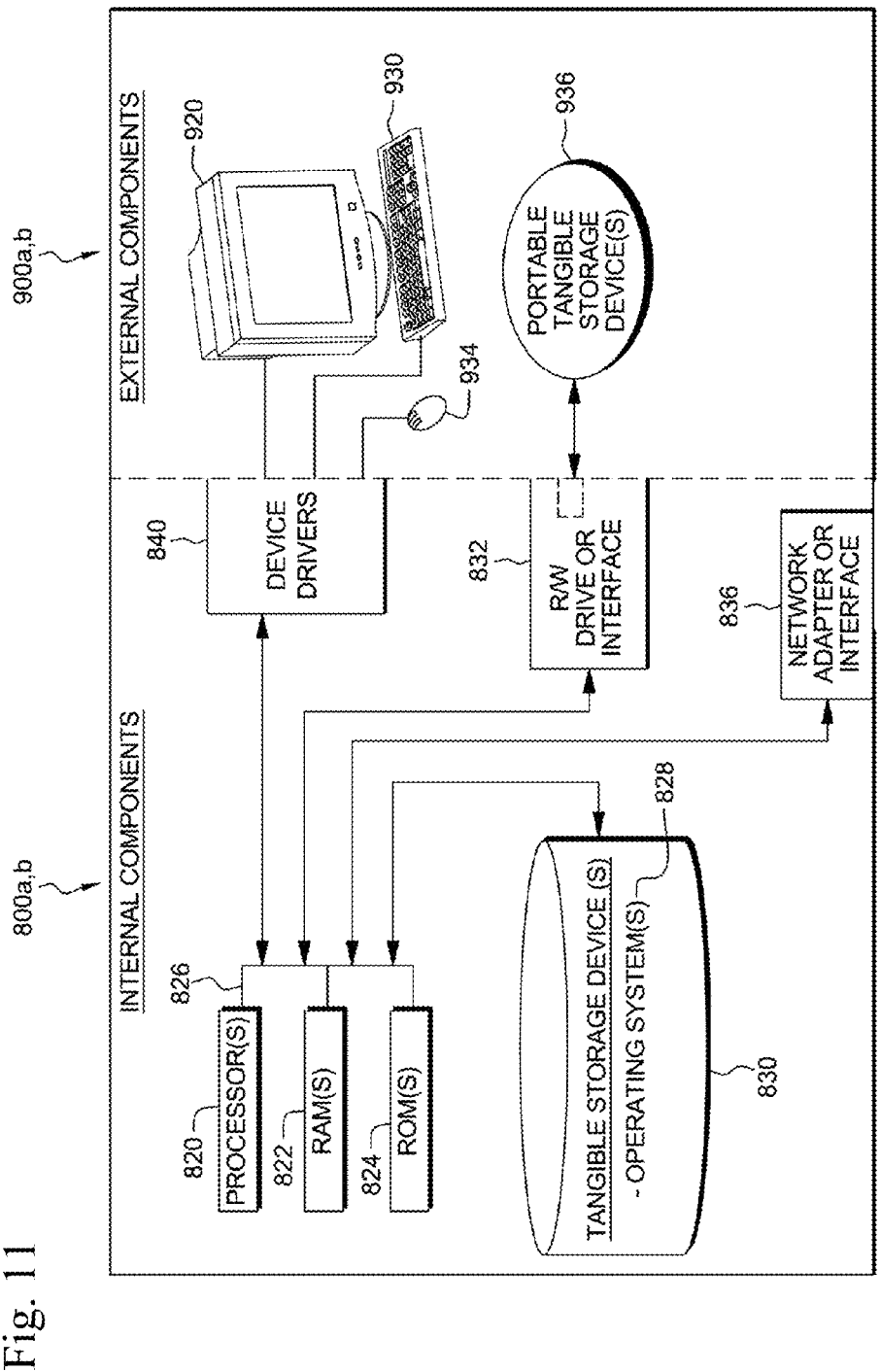
FIG. 11 illustrates internal and external components of a client computer and a server computer in which illustrative embodiments may be implemented.

Program code, meta-models, a Service-oriented architecture (SOA) industry model repository (IMR) component 102 illustrated in FIG. 2, and programs such as enterprise meta-model topic map generator program 67 and version compare meta-model program 66 may be stored on at least one of one or more computer-readable tangible storage devices 830 shown in FIG. 11, on at least one of one or more portable computer-readable tangible storage devices 936 as shown in FIG. 11, on storage unit 53 connected to network 50, or downloaded to a data processing system or other device for use. For example, program code, meta-models, SOA IMR component 102, and programs such as enterprise meta-model topic map generator program 67 and version compare meta-model program 66 may be stored on at least one of one or more tangible storage devices 830 on server computer 54 and downloaded to client computer 52 over network 50 for use on client computer 52. Alternatively, server computer 54 can be a web server, and the program code, meta-models, SOA IMR component 102, and programs such as enterprise meta-model topic map generator program 67 and version compare meta-model program 66 may be stored on at least one of the one or more tangible storage devices 830 on server computer 54 and accessed on client computer 52. Enterprise meta-model topic map generator program 67 and version compare meta-model program 66 can be accessed on client computer 52 through topic map interface 104. In other exemplary embodiments, the program code, meta-models, SOA IMR component 102, and programs such as enterprise meta-model topic map generator program 67 and version compare meta-model program 66 may be stored on at least one of one or more computer-readable tangible storage devices 830 on client computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 2 shows an example of an IMR architecture system 100 including SOA IMR component 102. IMR architecture system 100 includes meta-data representations of versions of an enterprise model within SOA IMR component 102 as well as a model manager for managing the versions of the enterprise model. IMR architecture system 100 may be part of the network data processing system 51 shown in FIG. 1. SOA IMR component 102 provides tools to facilitate the consumption and reuse of model assets through topic map IMR meta-model creation and topic map interface 104. SOA IMR component 102 is discussed in further detail in an application entitled, "SERVICE-ORIENTED ARCHITECTURE INDUSTRY MODEL REPOSITORY META-MODEL WITH A STANDARD BASED INDEX", U.S. Publication No. 2011-0153636, filed Dec. 17, 2009. Through topic map interface 104, queries between different versions of the enterprise model may be carried out as discussed in further detail below.

IMR architecture system 100 includes federated physical model assets 103 that are stored in different types of repositories depending on the model driven framework tools and products that IMR architecture system 100 deploys. Federated physical model assets 103 may include framework, industry models, business models, unified modeling language (UML) design applications, data models, business services, service components, and technical services. Federated physical model assets 103 are not limited to the assets shown in FIG. 2.

Applications and services 106 are provided to IMR users 108 through network 50, using interfaces 107. Interfaces 107 may be graphically enabled, allowing display of topic maps to IMR users 108, such as through a model manager. Interfaces 107 include reports generation and tools supporting multi-formats and visualization tools supporting complex views. Interfaces 107 may be packaged as an Eclipse client, provided by a vendor specialized in providing software development tools and products or deployed inside bigger scope modeling tools, for example IBM® Rational® Software Architect or WebSphere® Business Modeler, products of International Business Machines Corporation.

Applications and services 106 may include registration and profile management; creating and customizing repository meta-model; importing customized and disparate model/data into the repository; examining/decomposing complex diagrams and structures; structure, link, and trace change disparate model/assets; advanced search and query, navigate/browse data assets; select and download model/assets; customize/add models/assets submit for repository upload; querying between versions of the meta-models, and impact analysis. Applications and services 106 are not limited to the assets shown in FIG. 2. Applications and services 106 are described in greater detail in applications entitled, "FRAMEWORK TO POPULATE AND MAINTAIN A SERVICE-ORIENTED ARCHITECTURE INDUSTRY MODEL", U.S. Publication No. 2011-0153292, filed Dec. 17, 2009; "MANAGING AND MAINTAINING SCOPE IN A SERVICE-ORIENTED ARCHITECTURE INDUSTRY MODEL REPOSITORY", U.S. Publication No. 2011-0153293 filed Dec. 17, 2009; and "RECOGNITION OF AND SUPPORT FOR MULTIPLE VERSIONS OF AN ENTERPRISE CANONICAL MESSAGE MODEL" U.S. Publication No. 2011-0153767 filed Dec. 17, 2009. Interfaces 107 are further described in greater detail in an application entitled, "SERVICE-ORIENTED ARCHITECTURE INDUSTRY MODEL REPOSITORY META-MODEL WITH A STANDARD BASED INDEX", U.S. Publication No. 2011-0153636 filed Dec. 17, 2009.

IMR users 108 may include but are not limited to a repository administrator, a model manager, a system architect, and a business analyst.

Figure 3:
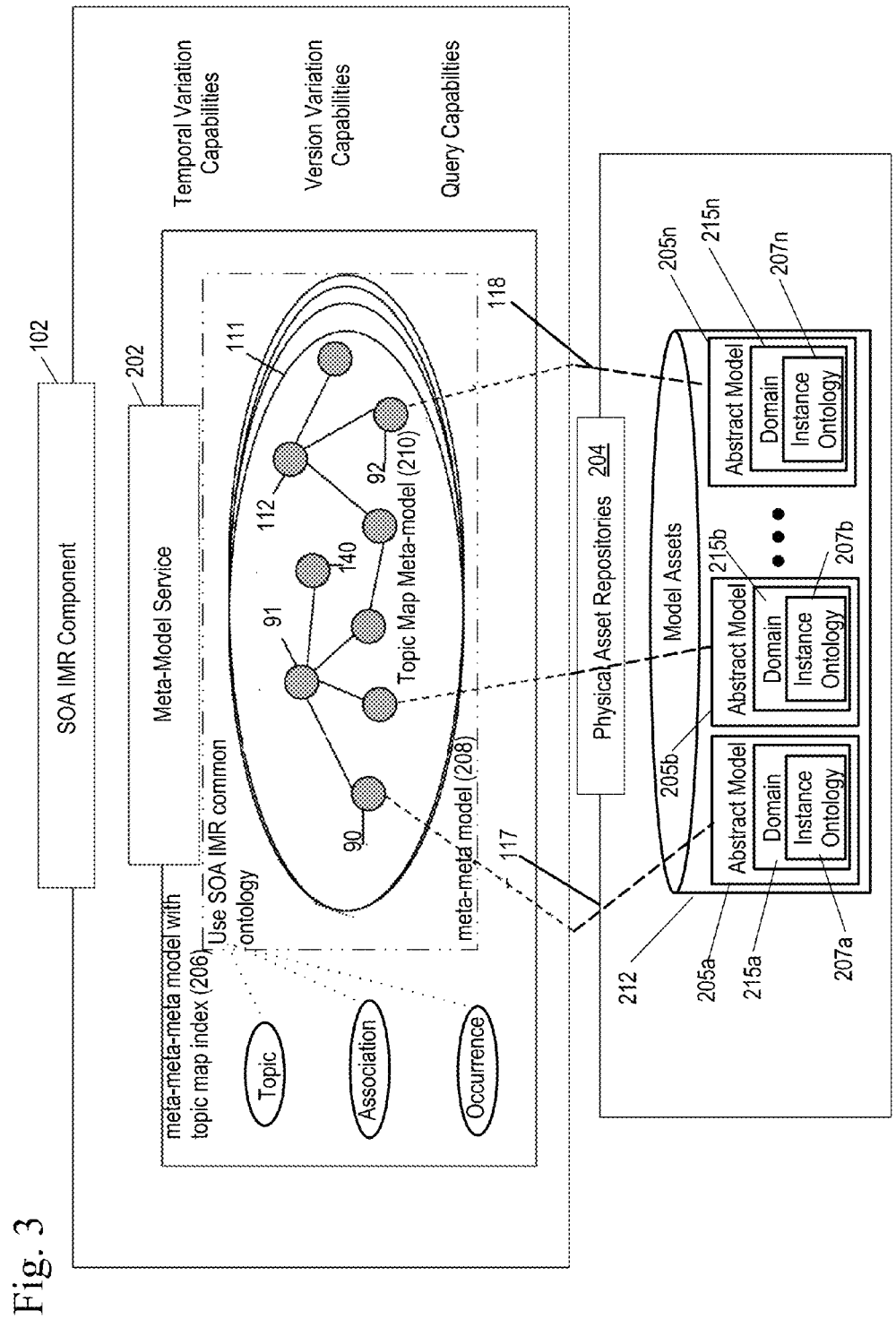
FIG. 3 shows an example of SOA IMR component 102 from FIG. 2 in greater detail

FIG. 3 shows an example of SOA IMR component 102 from FIG. 2 in greater detail. SOA IMR component 102 includes a Meta-Model service interface to a Meta-Model service 202. Meta-Model service 202 is associated with physical asset repositories 204. Within Meta-Model service 202 is a meta-meta-meta-model 206 with a topic map based index, an IMR common meta-meta-model 208 and at least one topic map meta-model 210 with data specific to an industry vertical. Topic map meta-model 210 is associated with physical asset repositories 204 of model assets 212. By using topic map meta-model 210 associated with model assets 212 that include abstract models in different versions or scopes 205a, 205b, 205n each with instance ontologies 207a, 207b, 207n, version x to version y, where y≠x, based off of meta-meta-meta-model 206 with the topic map based index and IMR common meta-meta-model 208, a topic map meta-model can be created with instance ontology that incorporates topic map indexing of instance ontology. Within model assets 212 are abstracts models 205a, 205b, 205n with instance ontologies 207a, 207b, 207n that correspond to different versions of the meta-model or enterprise meta-model of a complex legacy application environment or enterprise model.

Within model assets 212 are different versions of abstract models 205a, 205b, 205n, version x to version y, where y≠x, which versions can each be an enterprise meta-model such as reference semantic model (RSM). The RSM is a model that provides a meta-model representation for a user's process automation of assets. The model manager, which may be an IMR use 108, manages the meta-model representation of RSM for asset definitions, including their interrelationships as well as references to "real time" production control sensor data that can be attained with interaction to those assets.

Within abstract models 205a, 205b, 205n are domains 215a, 215b, 215n, respectively, with their own instance ontology 207a, 207b, 207n. Instance ontology 207 is equivalent to a meta-model for each domain. Instance ontology 207a, 207b, 207n can also be referred to as instance data. An example of domain 215a, 215b, 215n is water, and an example of instance ontology 207a, 207b, 207n is the pipes associated with the water.

The cloud or topic map 111 has topics 90, 91, 92, 112, and 140 (shown as circles), which topics may be any of the meta-models present in the Meta-Model service 202 or in physical asset repositories 204. For example, if topic 90 was an asset that existed in model assets 212, topic 90 would be associated with another topic 91 which may be an industry vertical meta-model. Topic 90 may have occurrences in abstract model 205a, accessible through a uniform resource identifier (URI) 117, shown by the dashed lines. Other topic 92 may have occurrences in abstract model 205n, within the model assets 212 accessible through URIs 118. By using topic maps as a meta-model internal to the physical asset repositories 204, a web service may programmatically access, manage, and maintain SOA IMR component 102.

Meta-Model service 202 of SOA IMR component 102 is an SOA IMR Meta-Model service using topic map meta-model 210, which is an ISO/IEC Standard (ISO 13250-1) topic map meta-model. Topic maps map both web and real-world information resources by reifying real-world resources as "subjects" and creating "topic" constructs to capture their characteristics and relationships with other topics and subjects. By using topic maps as a meta-model internal to the physical asset repositories 204, a common interface to Meta-Model service 202 allows users to programmatically access, manage, and maintain these meta-models.

The Meta-Model service 202 maps or implements the ISO topic map meta-model 210 to a web ontology language (OWL) representation of the topic map. The SOA IMR component 102 provides the context for the implementation of the ISO topic map meta-model 210 to the OWL representation of the topic map. The OWL representation of the topic map is stored in a resource description framework (RDF) repository, for example repositories 53, 204.

Some of the advantages of using a topic map based meta-model for SOA IMR component 102 are that the topic maps are independent of the implementation and are reusable for other service consumers. Topic maps can map to multiple occurrences and each model can be stored in different locations as different types of physical occurrences. Furthermore, Meta-Model service 202 provides and supports full read and write capabilities of abstract and instance ontology regarding an industry model.

SOA IMR component 102 has the capability of managing multiple domains. Each domain has its own meta-model and its own instance ontology. A topic map meta-model is created by SOA IMR component 102 through enterprise meta-model topic map generator program 67.

Figure 4:
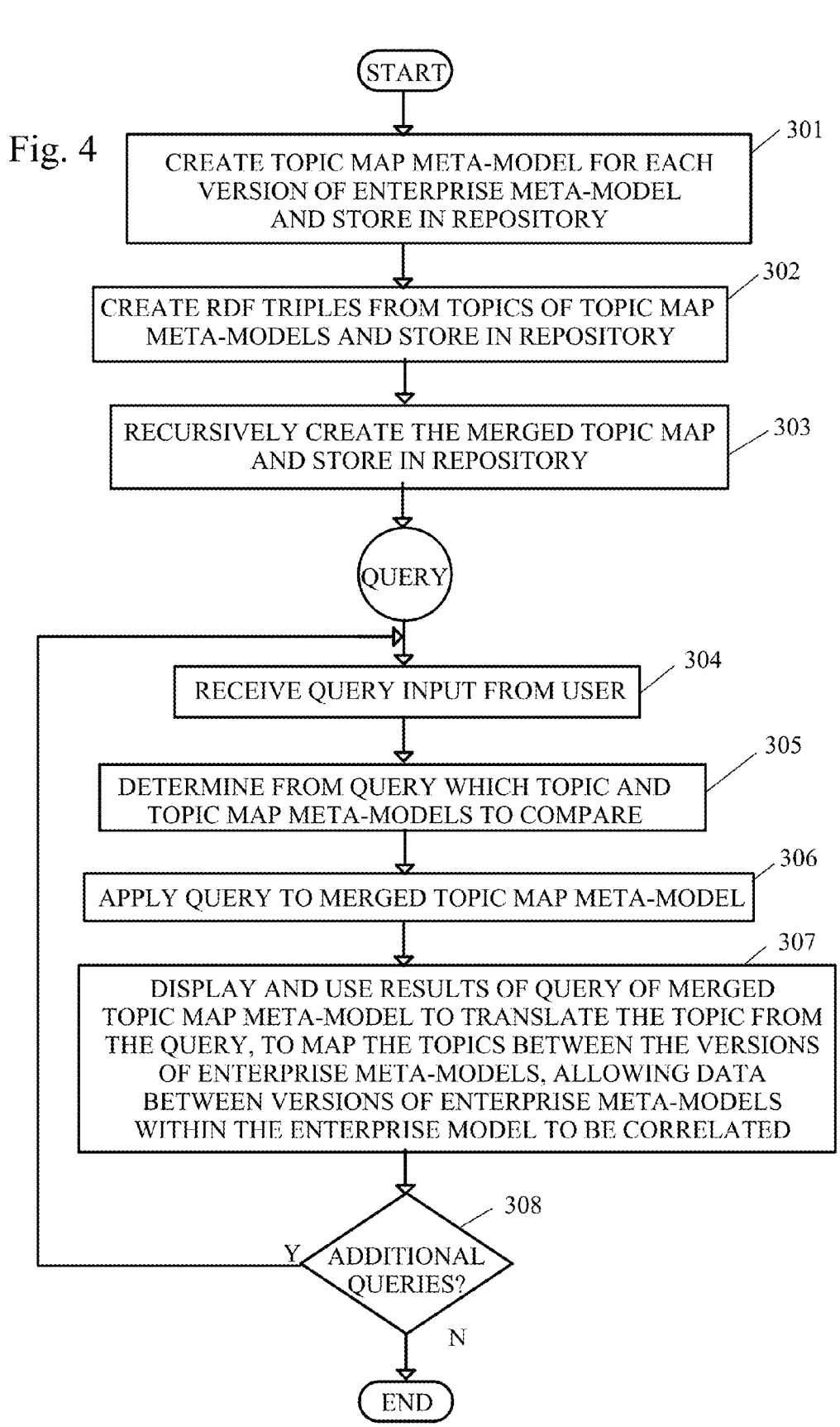
FIG. 4 shows a flowchart of a method of managing multiple versions of enterprise meta-models and querying differences between the multiple versions of the enterprise model to translate the multiple versions of the enterprise meta-model according to an illustrative embodiment.

FIG. 4 shows a flowchart of a method of managing multiple versions of an enterprise meta-model and querying the differences between multiple versions of the enterprise meta-model to translate the multiple versions of the enterprise meta-model according to an illustrative embodiment.

Figure 5:
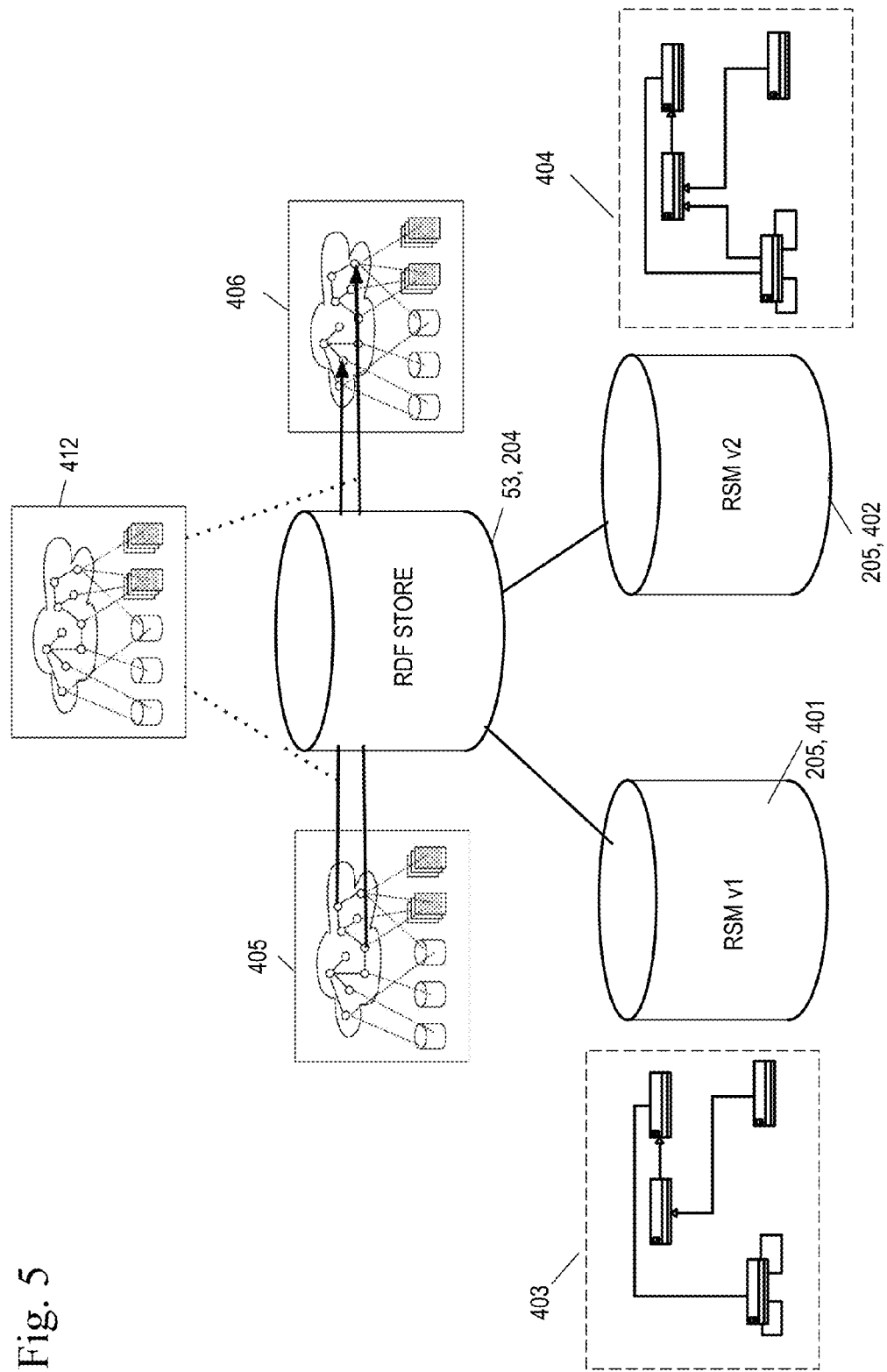
FIG. 5 shows an example of a possible relationship between version x of a model and version x, where y≠x and a merged topic map of the two versions.

In a first step, enterprise meta-model topic map generator program 67 creates topic map meta-models, including a topic map based index and instance ontology, for every version of the enterprise meta-model and stores the created topic map meta-models in a repository (step 301). Enterprise meta-model topic map generator program 67 assigns, to each topic map meta-model created for each version of the enterprise meta-model, its own specific scope. The repository may be repository 53, 204, 401, 402 as shown in FIGS. 1 and 5. It should be noted that while separate repositories 401, 402 for the different versions of the enterprise meta-model are shown, one repository may be used. Similarly, the repository 53, 204 in which RDF triples are stored in the next step 302 may be the same repository as the repository in which the different versions of the enterprise meta-models are stored.

Figure 8:
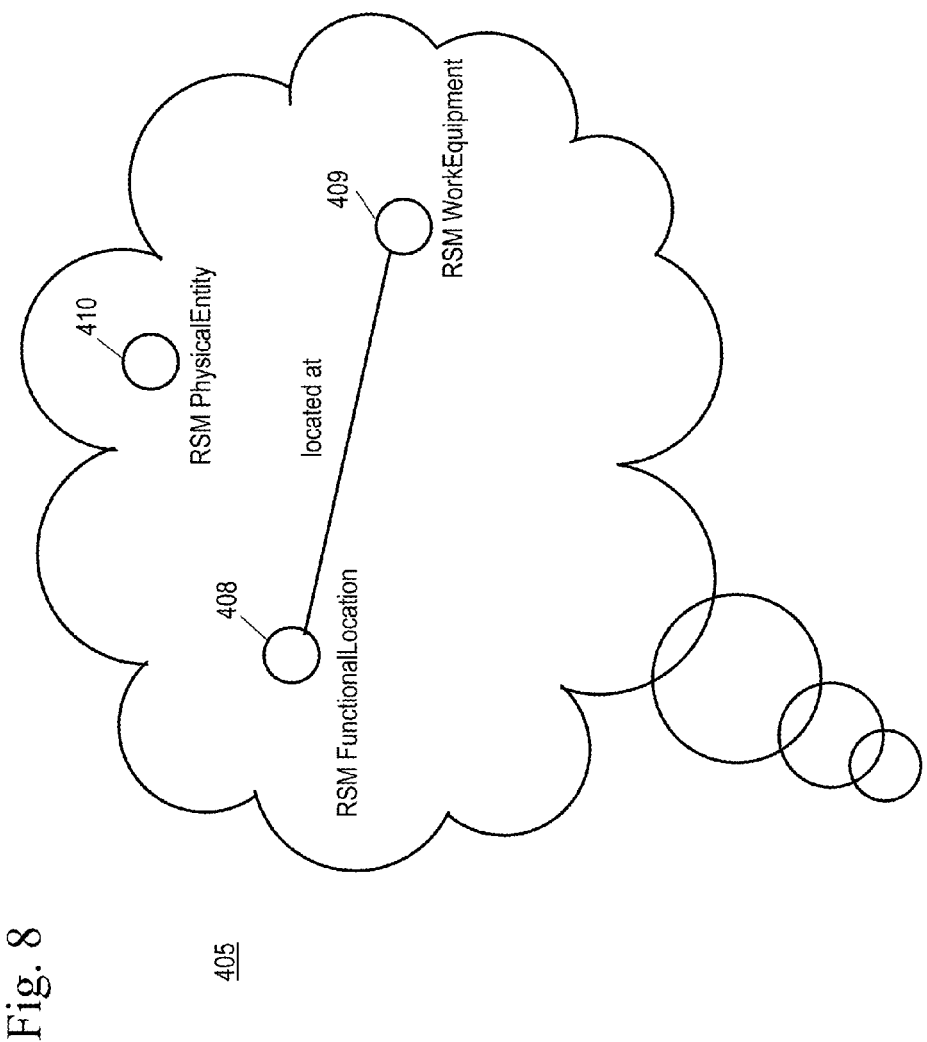
FIG. 8 shows an example of a portion of a topic map representation of a meta-model in version x, scope x.
Figure 9:
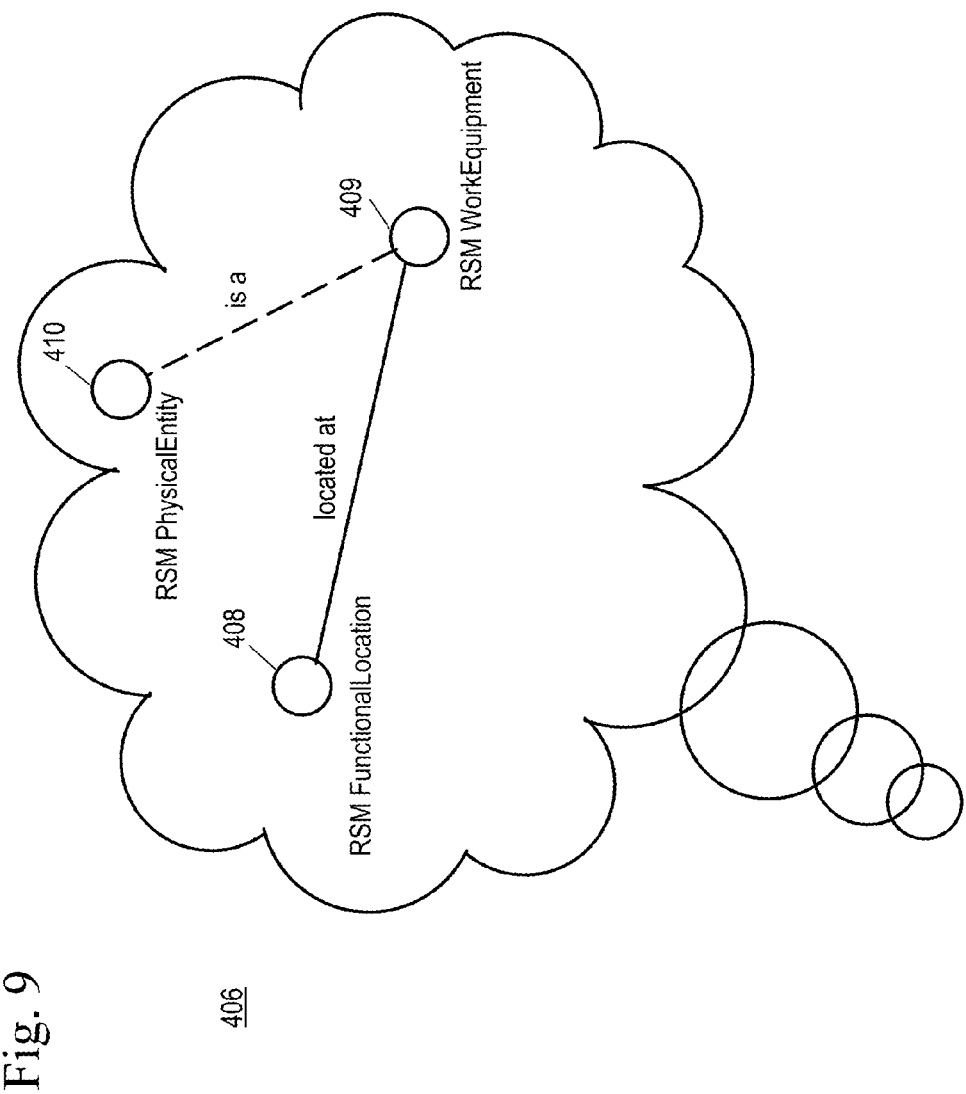
FIG. 9 shows an example of portion of a topic map representation of a meta-model in version y, scope y, where y≠x.

An example of a portion of a topic map representation of a meta-model in version x, scope x 405 is shown in FIG. 8 and an example of a portion of a topic map representation of the meta-model in version y, scope y 406, with y≠x, is shown in FIG. 9.

Figure 6:
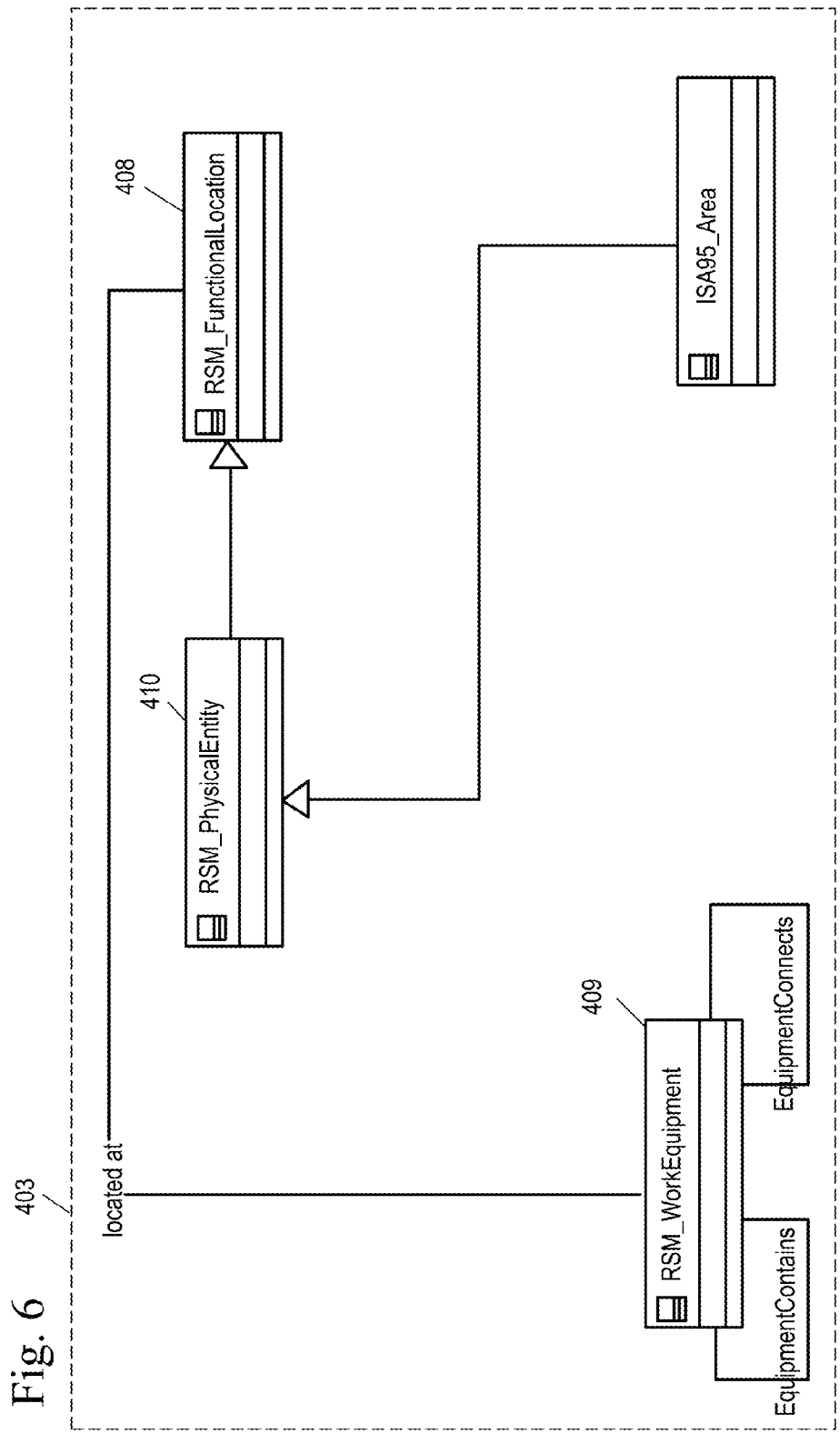
FIG. 6 shows an example of a UML representation of a meta-model in version x, scope x.

FIG. 6 shows an example of a UML representation 403 of the topic map representation of a meta-model in version x, scope x, a portion of which topic map representation is shown in FIG. 8. In FIG. 8, the portion of the topic map representation of the enterprise meta-model 405 shows only the relationship between the RSM_WorkEquipment 409 and RSM_FunctionalLocation 408, and that RSM_PhysicalEntity 410 exists. The topics of EquipmentContains, EquipmentConnects, and ISA95_Area shown in FIG. 6 are not shown in FIG. 8 in order to focus on the differences between version x and version y of the meta-models.

In the portion of the topic map representation 405 shown in FIG. 8, the topic of RSM_WorkEquipment 409 is located at or has an occurrence at RSM_FunctionalLocation 408 (shown by a solid line). The topic of RSM_WorkEquipment 409 has the attributes or plays the role of equipment and the topic RSM_FunctionalLocation 408 has the attributes or plays the role of location. RSM_PhysicalEntity 410 is present.

Figure 7:
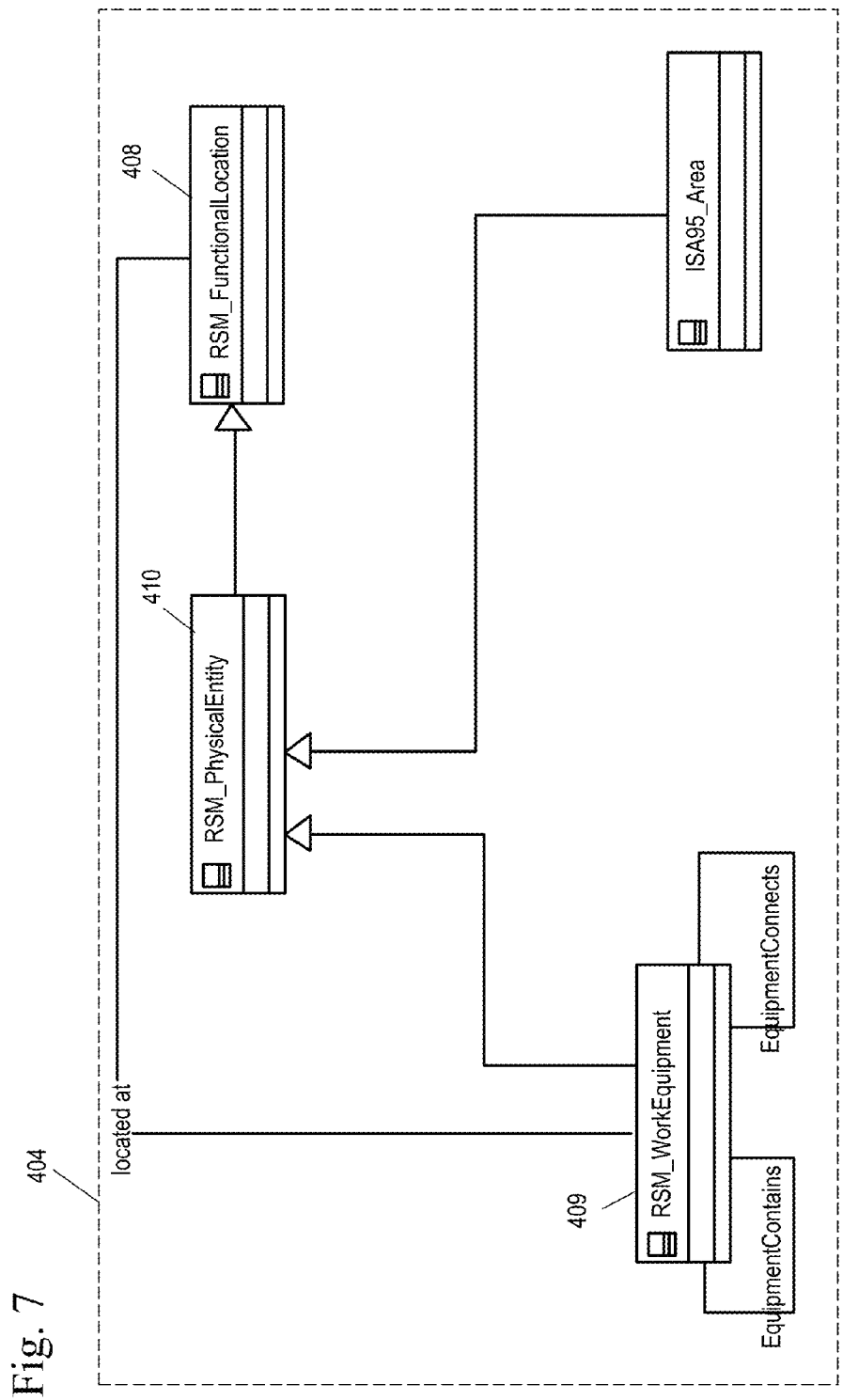
FIG. 7 shows an example of a UML representation of a meta-model in version y, scope y, where y≠x.

FIG. 7 shows an example of a UML representation 404 of a topic map representation of a meta-model in version y, scope y, a portion of which topic map representation is shown in FIG. 9, where y≠x. In FIG. 9, the portion of the topic map representation of the enterprise meta-model 406 shows only the relationship between RSM_WorkEquipment 409, RSM_FunctionalLocation 408, and RSM_PhysicalEntity 410. The topics of EquipmentContains, EquipmentConnects, and ISA95_Area shown in FIG. 7 are not shown in FIG. 8 in order to focus on the differences between version x and version y of the meta-models.

In the portion of topic map representation shown in FIG. 9, the topic of RSM_WorkEquipment 409 is located at or has an occurrence at RSM_FunctionalLocation 408 (shown by a solid line). The topic of RSM_WorkEquipment 409 has the attributes or plays the role of equipment and the topic RSM_FunctionalLocation 408 has the attributes or plays the role of location. RSM_WorkEquipment 409 is a RSM_PhysicalEntity 410 (shown by a dashed line).

Referring back to FIG. 4, enterprise meta-model topic map generator program 67 creates RDF triples from the topics of the topic map meta-models and stores the RDF triples in a repository (step 302). The repository may be repository 53, 204, 401, 402 as shown in FIGS. 1 and 2.

FIG. 5 shows an example of a possible relationship between version x of a model 405 (FIG. 8 based on FIG. 6) and version y 406 (FIG. 9 based on FIG. 7), where y≠x and a merged topic map 412 (FIG. 10) of the two versions. Stored within a resource description framework (RDF) repository, for example repository 53, 204 are RDF triples of the assigned topics, occurrences, and attributes of the topic map meta-model of version x in scope x 405 of the RSM enterprise meta-model. The RSM enterprise meta-model in which the topic map meta-model 405 is based may be stored within the RDF repository or in a separate repository 401, as shown in FIG. 5. The separate repository 401 is preferably part of the physical asset repositories 204 of the SOA IMR component 102.

From the topic map of version x 405 of the RSM enterprise meta-model, in this example version 1, the RDF triples in Table 1 below represent an association between a RSM_WorkEquipment being connected to the other pieces of RSM_WorkEquipment. The relationship between RSM_WorkEquipment and other pieces of RSM_WorkEquipment is the type "equipment_connects".

Note that for brevity in the following discussion, the following RDF namespace prefixes will be used, with (URLx) replacing an actual Uniform Resource Locator designation, or other designation of a location on a network:

TABLE 1

| Prefix | Prefix |
|---|---|
| rdf_syntax | http |
| foo | (URL1) |
| anne | (URL2) |

Therefore, for foo#rsm_Workequiment_equipmentconnects_rsmworkequipment, the following RDF triples would be present for the association between WorkEquipment and RSM_WorkEquipment. A UML representation 403 of version x, scope x of the enterprise meta-model is shown in FIG. 6.

TABLE 2

| Subject | Predicate | Object |
|---|---|---|
| foo#rsm_workequipment_equipmentconnects_rsm_workequipment | rdf_syntax#type | anne#association |
| foo#rsm_workequipment_equipmentconnects_rsm_workequipment | anne#hasScope | foo#ibm_oil |
| foo#rsm_workequipment_equipmentconnects_rsm_workequipment | anne#hasScope | foo#v1 |
| foo#rsm_workequipment_equipmentconnects_rsm_workequipment | foo#type | foo#equipment_connects |
| foo#rsm_workequipment_equipmentconnects_rsm_workequipment | . . . | . . . |

Stored within a resource description framework (RDF) repository, for example repository 53, 204, are RDF triples of the assigned topics, occurrences, and attributes of the topic map meta-model of version x, scope x 405, where y≠x of the RSM enterprise meta-model. The RSM enterprise meta-model in which the topic map meta-model is based may be stored within the RDF repository or in a separate repository 402, as shown in FIG. 5. The separate repository 402 is preferably part of the physical asset repositories 204 of the SOA IMR component 102.

From the topic map representation of version y in scope y 406, where y≠x of the RSM enterprise meta-model, in this example version 2 the RDF triples in Table 3 below represent an association between a RSM_WorkEquipment being a type of RSM_PhysicalEntity. The relationship between RSM_WorkEquipment and RSM_PhysicalEntity is the type "is_a". Therefore, for foo#rsm_WorkEquipment_EquipmentConnects_RSM_WorkEquipment, the following RDF triples would be present for the association between WorkEquipment and RSM_WorkEquipment. A UML representation 404 of version y, where y≠x of the meta-model is shown in FIG. 7.

TABLE 3

| Subject | Predicate | Object |
|---|---|---|
| foo#rsm_workequipment_is_a_rsm_physicalentity | Rdf-syntax#type | anne#association |
| foo#rsm_workequipment_is_a_rsm_physicalentity | anne#hasScope | foo#ibm_oil |
| foo#rsm_workequipment_is_a_rsm_physicalentity | annel#hasScope | foo#v2 |
| foo#rsm_workequipment_is_a_rsm_physicalentity | foo#type | foo#is_a |
| foo#rsm_workequipment_is_a_rsm_physicalentity | ... | ... |

The difference between FIGS. 6 and 7 and FIGS. 8 and 9 and thus the difference between the two versions of the RSM enterprise meta-models is the relationship between the RSM_WorkEquipment and the RSM_PhysicalEntity. In version y, where y≠x or for example, version 2, RSM_WorkEquipment is a RSM_PhysicalEntity, whereas in version x, for example version 1, no such relationship is present, even though RSM_PhysicalEntity is present.

Referring back to FIG. 4, version compare meta-model program 66 recursively creates a merged topic map of the versions of the enterprise meta-model and stores the merged topic map in a repository (step 303). In other words, every time a new version of the enterprise meta-model is created, version compare meta-model program 66 creates the merged topic map meta-model to add the new version. Therefore, the merged topic map always contains all of the versions of the enterprise meta-model. The merged topic map meta-model includes a topic map based index and instance ontology from both versions of the enterprise meta-models. The repository may be repository 53, 204.

Version compare meta-model program 66 receives a query input from a user (step 304) through an interface, such as interface 104, 107. The interface may be topic map interface 104 or another interface 107. The search query preferably includes at least one domain, at least one a topic, and at least one scope. A radix may also be present as part of the search query. The query allows the user or a computer to obtain information regarding the differences in instance ontology and instance data that occurs between the two versions and to get the two versions of the enterprise meta-models to coexist and communicate with each other within the same merged enterprise model.

For example, the query can have the following syntax:
/search/<<<domain>>/<<<topic>>/<<<scope>>/

User 108 may input the query into topic map interface 104. Topic map interface 104 may be a representational state transfer (REST) based interface, although other interfaces may be used. A REST interface is preferably used since REST is a standards-based Internet protocol and is self documenting in terms of how to do the search, for example which domain to search, which topic to search, and how much of the topic map meta-model should be returned as a result of the search.

The domain of the query is the overall relevant system to be searched. The topic of the query is the name of an asset relevant to the search. The scope of the query is a subset of the domain, for example, a model version. If a radix is included within the search query, the radix of the query is the number of degrees from the search topic to be returned. For example, a radix of 1 would display results directly connected to the topic. A radix of 2 would display results of everything directly connected to the topic and directly connected to the matters directly connected to the topic.

An example of a search query received in step 304 to compare the version x of the enterprise model in scope x of the topic map shown in FIG. 8 to version y of the enterprise model in scope y of the topic map shown in FIG. 9 is,
/search/domain/TopicMapService/topic/RSM_WorkEquipment/scope/vx-vy The search query is therefore to query the differences between a topic, RSM_WorkEquipment, in version x and version y of the model. It should be noted that while version x is compared to version y in the above query, any version can be compared to any other version of the meta-model, for example version 4 to version 2 or version 5 to version 1 for example. It should also be noted that while only two versions are shown by example being compared at one time, multiple versions may be compared at one time.

Version compare meta-model program 66 then determines from the query which topics and which topic map versions to compare (step 305). Version compare meta-model program 66 then applies the query input from the user 108 to the merged topic map meta-model in a new scope (step 306).

The version compare meta-model program 66 uses the results of the query of the merged topic map meta-model to automatically translate the topics from the query of the merged topic map. In translating the topics form the query of the merged topic map, version compare meta-model program 66 maps or corresponds the topics between the two versions of the enterprise meta-models of the query, allowing data between the different versions of the meta-models in different scopes within the enterprise model to be correlated (step 307). Version compare meta-model program 66 displays the results of the query to the user through an interface. For example, a topic or association that exists in one version of the meta-model may not be present in a later or another version and therefore the versions of the meta-model need to be altered to compensate for this lack of a topic or association.

If there are additional queries (step 308), return to step 304 of receiving a query from a user. If there are no additional queries (step 308), the method ends.

Figure 10:
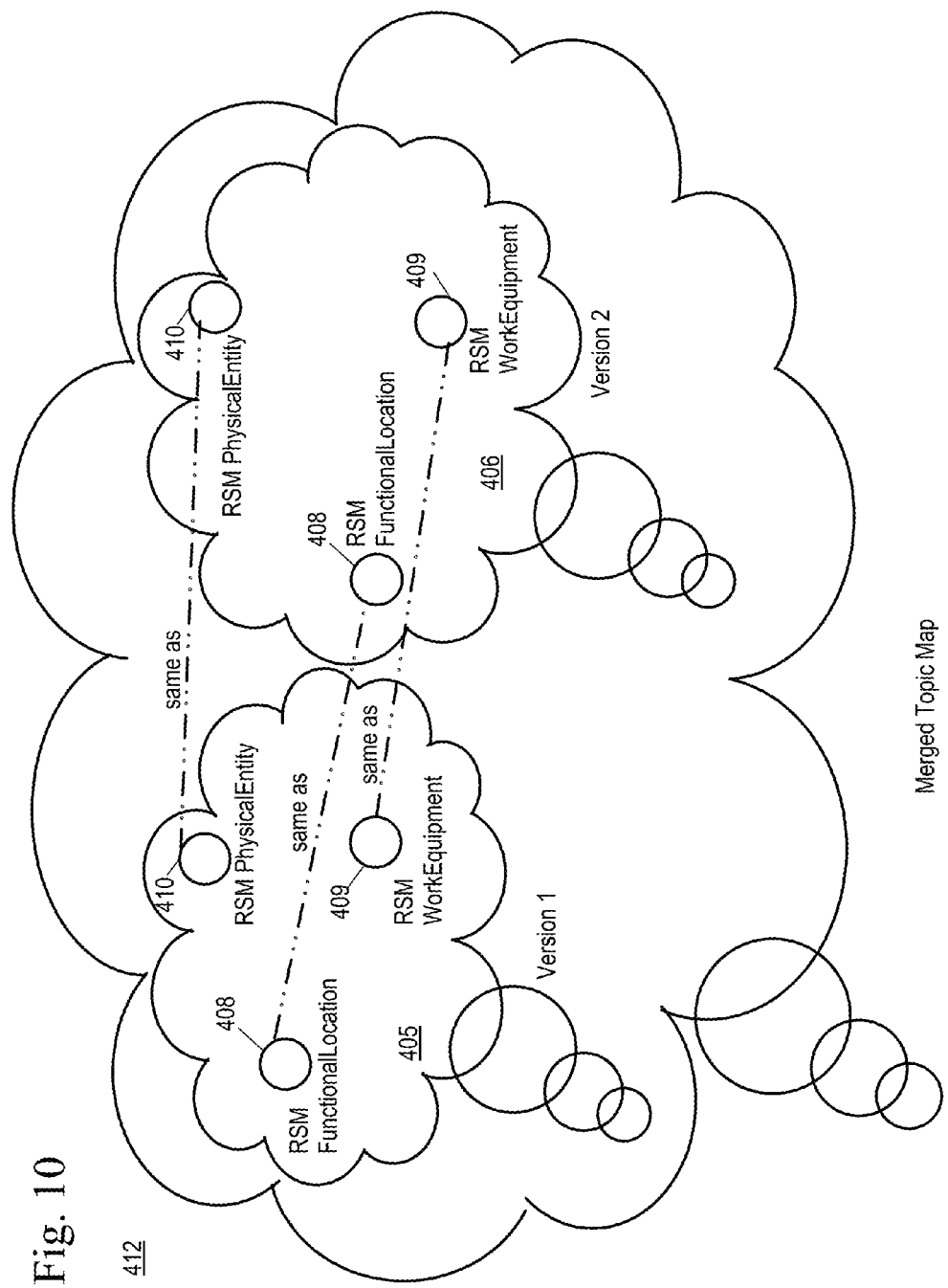
FIG. 10 an exemplary portion of a topic map representation of the merged topic map meta-model.

FIG. 10 shows an exemplary portion of a topic map representation of the merged topic map meta-model 412. The merged topic map meta-model 412 includes topic map representation of version x of an enterprise meta-model in scope x 405 and topic map representation of version y of an enterprise meta-model in scope y 406. The dash-dot-dot lines show the topics that are the "same as" between the two versions being compared. The remaining relationships present within each version of the topic map meta models being compared has been removed for simplicity.

FIG. 11 illustrates internal and external components of client computer 52 and server computer 54 in which illustrative embodiments may be implemented. In FIG. 11, client computer 52 and server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, enterprise meta-model topic map generator program 67 and version compare meta-model program 66 are stored on one or more of the computer-readable tangible storage devices 830 for execution by one or more of the processors 820 via one or more of the RAMs 822 (which typically include cache memory). In the embodiment illustrated in FIG. 11, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Enterprise meta-model topic map generator program 67, and version compare meta-model program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Enterprise meta-model topic map generator program 67, or a version compare meta-model program 66 can be downloaded to computer 52 and server computer 54 from an external computer via a network (for example, the Internet, a local area network or other, wide area network) and network adapter or interface 836. From the network adapter or interface 836, enterprise meta-model topic map generator program 67 and version compare meta-model program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Enterprise meta-model topic map generator program 67 and version compare meta-model program 66 can be written in various programming languages including low-level, high-level, object-oriented or non object-oriented languages. Alternatively, the functions of an enterprise meta-model topic map generator program 67 and a version compare meta-model program 66 can be implemented in whole or in part by computer circuits and other hardware (not shown).

Based on the foregoing, a computer system, method and program product have been disclosed for managing multiple versions of enterprise meta-models using semantic based indexing. However, numerous modifications and substitutions can be made without deviating from the scope of the present invention. Therefore, the present invention has been disclosed by way of example and not limitation.

What is claimed is:

1. A method of managing multiple versions of enterprise meta-models within an enterprise model using semantic based indexing, the method comprising the steps of:
   a computer receiving a search query from a user;
   the computer determining from the search query a topic and at least two versions of a topic map meta-model of the enterprise meta-models within the enterprise model to compare;
   the computer applying the search query from the user to a merged topic map meta-model of the at least two versions of the topic map meta-model by searching a topic map based index of the merged topic map meta-model for the topic, and producing a result; and
   the computer using the produced result to translate the topic from the search query in one of the at least two versions of the topic map meta-model of the enterprise meta-models to another version of the at least two versions of the topic map meta-model of the enterprise meta-models, and allowing data between the at least two versions of the topic map meta-model of the enterprise meta-models within the enterprise model to be correlated.

2. The method of claim 1, further comprising, prior to the computer receiving a search query from the user:
   the computer creating a version of a topic map meta-model including a topic map based index and instance ontology, for each version of the-enterprise meta-models within the enterprise model, each version of the topic map meta-model being in a separate scope; and
   the computer storing each version of the topic map meta-model in a repository.

3. The method of claim 1, further comprising, prior to the computer receiving a search query from the user:
   the computer creating resource description framework triples for each version of the topic map meta-model; and
   the computer storing the resource description framework triples into a repository.

4. The method of claim 1, further comprising:
   the computer recursively creating a merged topic map in a scope, the merged topic map including a topic map based index and instance ontology for each additional version of the enterprise meta-models; and
   the computer storing the merged topic map into a repository.

5. The method of claim 4, wherein the scope of the merged topic map is a scope newer than a scope of a previous version of the merged topic map.

6. The method of claim 1, wherein the search query comprises a domain and a scope.

7. The method of claim 6, wherein the search query further comprises a radix.

8. A computer program product for managing multiple versions of enterprise meta-models within an enterprise model using semantic based indexing, the computer program product comprising:

one or more computer-readable storage devices;
program instructions, stored on at least one of the one or more storage devices, to receive a search query from a user;
program instructions, stored on at least one of the one or more storage devices, to determine from the search query a topic and at least two versions of a topic map meta-model of the enterprise meta-models within the enterprise model to compare;
program instructions, stored on at least one of the one or more storage devices, to apply the search query from the user to a merged topic map meta-model of the at least two versions of the topic map meta-model by searching a topic map based index of the merged topic map meta-model for the topic, and producing a result; and
program instructions, stored on at least one of the one or more storage devices, to use the produced result to translate the topic from the search query in one of the at least two versions of the topic map meta-model of the enterprise meta-models to another version of the at least two versions of the topic map meta-model of the enterprise meta-models, and allowing data between the at least two versions of the topic map meta-model of the enterprise meta-models within the enterprise model to be correlated.

9. The computer program product of claim 8, further comprising:
program instructions, stored on at least one of the one or more storage devices, to create a version of a topic map meta-model including a topic map based index and instance ontology, for each version of the enterprise meta-models within the enterprise model, each version of the topic map meta-model being in a separate scope; and
program instructions, stored on at least one of the one or more storage devices, to store each version of the topic map meta-model in a repository.

10. The computer program product of claim 8, further comprising:
program instructions, stored on at least one of the one or more storage devices, to create resource description framework triples for each version of the topic map meta-model; and
program instructions, stored on at least one of the one or more storage devices, to store the resource description framework triples into a repository.

11. The computer program product of claim 8, further comprising:
program instructions, stored on at least one of the one or more storage devices, to recursively create a merged topic map in a scope, the merged topic map including a topic map based index and instance ontology for each additional version of the enterprise meta-models; and
program instructions, stored on at least one of the one or more storage devices, to store the merged topic map into a repository.

12. The computer program product of claim 11, wherein the scope of the merged topic map is a scope newer than a scope of a previous version of the merged topic map.

13. The computer program product of claim 8, wherein the search query comprises a domain and a scope.

14. The computer program product of claim 13, wherein the search query further comprises a radix.

15. A computer system of managing multiple versions of enterprise meta-models within an enterprise model using semantic based indexing, the computer system comprising:
one or more processors, one or more computer-readable memories and one or more computer-readable storage devices;
program instructions, stored on at least one of the one or more storage devices for execution by at least one of the one or more processors via at least one of the one or more memories, to receive a search query from a user;
program instructions, stored on at least one of the one or more storage devices for execution by at least one of the one or more processors via at least one of the one or more memories, to determine from the search query a topic and at least two versions of a topic map meta-model of the enterprise meta-models within the enterprise model to compare;
program instructions, stored on at least one of the one or more storage devices for execution by at least one of the one or more processors via at least one of the one or more memories, to apply the search query from the user to a merged topic map meta-model of the at least two versions of the topic map meta-model by searching a topic map based index of the merged topic map meta-model, and producing a result; and
program instructions, stored on at least one of the one or more storage devices for execution by at least one of the one or more processors via at least one of the one or more memories, to use the produced result to translate the topic from the search query in one of the at least two versions of the topic map meta-model of the enterprise meta-models to another version of the at least two versions of the topic map meta-model of the enterprise meta-models, and allowing data between the at least two versions of the topic map meta-model of the enterprise meta-models within the enterprise model to be correlated.

16. The computer system of claim 15, further comprising:
program instructions, stored on at least one of the one or more storage devices for execution by at least one of the one or more processors via at least one of the one or more memories, to create a version of a topic map meta-model including a topic map based index and instance ontology, for each version of the enterprise meta-models within the enterprise model, each version of the topic map meta-model being in a separate scope; and
program instructions, stored on at least one of the one or more storage devices for execution by at least one of the one or more processors via at least one of the one or more memories, to store each version of the topic map meta-model in a repository.

17. The computer system of claim 15, further comprising:
program instructions, stored on at least one of the one or more storage devices for execution by at least one of the one or more processors via at least one of the one or more memories, to create resource description framework triples for each version of the topic map meta-model; and
program instructions, stored on at least one of the one or more storage devices for execution by at least one of the one or more processors via at least one of the one or more memories, to store the resource description framework triples into a repository.

18. The computer system of claim 15, further comprising:
program instructions, stored on at least one of the one or more storage devices for execution by at least one of the one or more processors via at least one of the one or more memories, to recursively create a merged topic map in a scope, the merged topic map including a topic map based index and instance ontology for each additional version of the enterprise meta-models; and program instructions, stored on at least one of the one or more storage devices for execution by at least one of the one or more processors via at least one of the one or more memories, to store the merged topic map into a repository.

19. The computer system of claim 18, wherein the scope of the merged topic map is a scope newer than a scope of a previous version of the merged topic map.

20. The computer system of claim 15, wherein the search query comprises a domain and a scope.

21. The computer system of claim 20, wherein the search query further comprises a radix.

* * * * *